United States Patent [19]

Adams

[11] Patent Number: 5,634,658
[45] Date of Patent: Jun. 3, 1997

[54] AIR BAG CUSHION RETENTION METHOD

[75] Inventor: Gary V. Adams, Brigham City, Utah

[73] Assignee: Morton International, Inc., Chicago, Ill.

[21] Appl. No.: 610,899

[22] Filed: Mar. 5, 1996

Related U.S. Application Data

[63] Continuation of Ser. No. 406,256, Mar. 16, 1995, abandoned, which is a continuation of Ser. No. 252,550, Jun. 1, 1994, abandoned, which is a continuation of Ser. No. 61,947, May 17, 1993, abandoned.

[51] Int. Cl.$^6$ ................................................ B60R 21/16
[52] U.S. Cl. ............................................ 280/728.2; 280/731
[58] Field of Search ............................ 280/728.1, 728.2, 280/743.1, 731, 732

[56] References Cited

U.S. PATENT DOCUMENTS

| | | | |
|---|---|---|---|
| 3,674,284 | 7/1972 | Lohr. | |
| 4,101,146 | 7/1978 | Oehm | 280/731 |
| 4,167,276 | 9/1979 | Bell et al. | 280/731 |
| 4,183,550 | 1/1980 | Sudou | 280/743 |
| 4,752,083 | 6/1988 | Honda | 280/731 |
| 4,810,005 | 3/1989 | Fohl | 280/732 |
| 4,828,286 | 5/1989 | Fohl | 280/731 |
| 4,830,401 | 5/1989 | Honda | 280/736 |
| 5,011,181 | 4/1991 | Laucht et al. | 280/731 |
| 5,141,247 | 8/1992 | Barth | 280/728 |

FOREIGN PATENT DOCUMENTS

| | | | |
|---|---|---|---|
| 54-69543 | 5/1979 | Japan | 280/743 R |
| 63-184545 | 7/1988 | Japan | 280/728 A |

*Primary Examiner*—Eric D. Culbreth
*Attorney, Agent, or Firm*—Gerald K. White

[57] ABSTRACT

A vehicle occupant air bag module safety apparatus includes an inflatable air bag cushion, an inflator for inflating the air bag cushion, and a module housing or mounting plate for supporting the air bag cushion and the inflator on a steering wheel. For securing the air bag cushion to the inflator and the module housing or mounting plate an annular portion of the air bag cushion adjacent the gas inlet opening thereof is clamped between a curved annular portion of the module housing or mounting plate adjacent an opening therein and the adjacent lower side of the inflator flange and the inflator lower wall portion including a merging annular region of the inflator lower wall portion and the inflator flange lower side.

6 Claims, 3 Drawing Sheets

AIR BAG CUSHION RETENTION METHOD

This a continuation of application Ser. No. 08/406,256, filed Mar. 16, 1995 which is a continuation of application Ser. No. 08/252,550, filed Jun. 1, 1994 which in turn is a continuation of application Ser. No. 061,947, filed May 17, 1993 all now abandoned.

BACKGROUND OF THE INVENTION

1. Field of the Invention

This invention relates to an inflatable type occupant restraint system comprising an air bag module assembly which is provided in automobile or other automotive vehicles for the protection of the driver and/or passengers in the event of a collision. More particularly, the invention relates to an improvement in the method and means provided for holding the air bag or cushion in the air bag module assembly.

2. Description of the Related Art

The assembly of an air bag module involves the manufacture, installation and checking of many components. Among such components that are common to all air bag modules are the cover, a cushion, cushion holder means including an annular retainer or retaining ring, a supporting plate such as a module housing or mounting plate, fasteners, a gas generator or inflator, and means to attach the assembly to a steering wheel, dashboard or another appropriate part of the vehicle.

In such air bag modules, a central inflating gas inlet opening of an air bag cushion is held, that is, clamped, between a flange of an inflator and an annular retaining ring through a module housing or mounting plate. Rivets or other fasteners are used to attach the retaining ring to the gas inlet opening of the cushion. The edge of the opening of the cushion is disposed in a substantially even manner with the inner circular edge of the retaining ring. The retaining ring with the air bag cushion affixed thereto is then bolted to the module housing and the flange of the inflator with the inflator so arranged that the flange thereof is positioned externally of the cushion and the module housing.

The force holding the air bag cushion to the inflator and module housing is concentrated in the shearing resistance of that part of the cushion which has a width corresponding to the diameter of the rivet or other fastener and a length corresponding to the distance from the rivet to the edge of the gas inlet opening of the air bag cushion.

The use of rivets to attach the air bag cushion to the retaining ring and thereby to the module housing and inflator is a major cause of reworking inflator module assemblies in the manufacture thereof. When reworking is not possible, the defective, air bag modules must be discarded. This results in lost production and increased cost of manufacturing. The non use of the retaining ring and associated rivets or other fasteners in the manufacture of the air bag module assembly would eliminate a major cause for reworking and disposal of defective inflator modules.

Thus, there is a need and a demand for the provision of a better and a less costly means of air bag cushion retention in an air bag module assembly. The present invention was devised to fill the gap that has existed in the art in this respect.

SUMMARY OF THE INVENTION

An object of the invention is to provide a better and less costly means of air bag cushion retention in an air bag module assembly.

Another object of the invention is to provide such an improved air bag cushion retention means that effects an improvement in the seal of the inflating gas inlet opening of the air bag cushion.

A further object of the invention is to provide an improved air bag cushion retention means that effects a beneficial stiffening of the module housing or mounting plate.

Another object of the invention is to provide an improved method of securing an air bag cushion to a mating module component which consists of an inflator, a module housing or mounting plate and a cosmetic cover using the inflator flange as a single clamping component and with the cushion clamped around the module housing or mounting plate.

In accomplishing these and other objectives of the invention, there is provided an air bag module in which the gas inlet opening of a cushion is held between the flange and a body portion of an inflator and an opening in a module housing or mounting plate, and these components are clamped by a plurality of studs and nuts.

In assembling the cushion to the module housing or mounting plate and the inflator, a plurality of studs are inserted through holes in the inflator flange from the upper side thereof adjacent the inflator upper wall containing generated gas exit ports. The studs clinch into openings in the inflator flange with the distal ends thereof extending parallel to the lower wall of the inflator.

The inflator is then inserted in the gas inlet opening of the cushion, the diameter of which is less than that of the outside diameter of the inflator at the lower wall thereof. The inflator is so positioned that the edge of the cushion around the gas inlet opening is wrapped around and lies inwards of and beyond the 10 inflator flange. With the cushion opening edge so disposed, each of the studs extending from the inflator is inserted through a hole individually associated therewith that is provided in the cushion.

The inflator lower wall is then inserted through the opening of the module housing or mounting plate with each of the studs passing through an individually associated hole provided therein adjacent the opening. The diameter of the opening in the module housing or mounting plate is slightly larger than the diameter of the lower wall of the inflator. This allows the edge of the cushion gas inlet opening to extend outwardly past the inflator flange into a narrow annular opening between the inflator lower wall and the opening of the module housing or mounting plate. In accordance with the invention, the edge of the opening of the module housing or mounting plate is curved to match the curvature of the lower wall of the inflator merging with the adjacent lower facing side of the inflator flange.

When nuts are provided on the studs and tightened, an annular cushion portion adjacent the gas inlet opening is clamped between the inflator flange and the module housing or mounting plate. Additionally, an annular cushion portion closest to the edge of the cushion gas inlet opening is clamped around the curvature of the opening of the module housing or mounting plate and around the body of the lower side of the inflator. To improve the clamping and thereby the force holding the cushion to the module housing and inflator, the annular portion of the cushion closest to the edge of the cushion gas inlet opening may be doubled back around the curved portion of the module housing or mounting plate opening and under the inflator flange. The force holding the gas inlet opening of the cushion to the inflator and module housing or mounting plate is evenly distributed over the entire area of the abutment involving the clamped annular portion of the cushion.

With this arrangement the inflator flange is positioned internally of the cushion.

In accordance with the invention, the air bag may also be inserted in an opening in an air bag cover retention retainer with the studs passing through holes provided therein.

The various features of novelty that characterize the invention are pointed out with particularity in the claims that are annexed to and form a part of this specification. For a better understanding of the invention, its operating advantages, and specific objects attained by its use, reference is made to the accompanying drawings and descriptive matter in which a preferred embodiment of the invention is illustrated.

DESCRIPTION OF THE PRIOR ART

Figure 1:
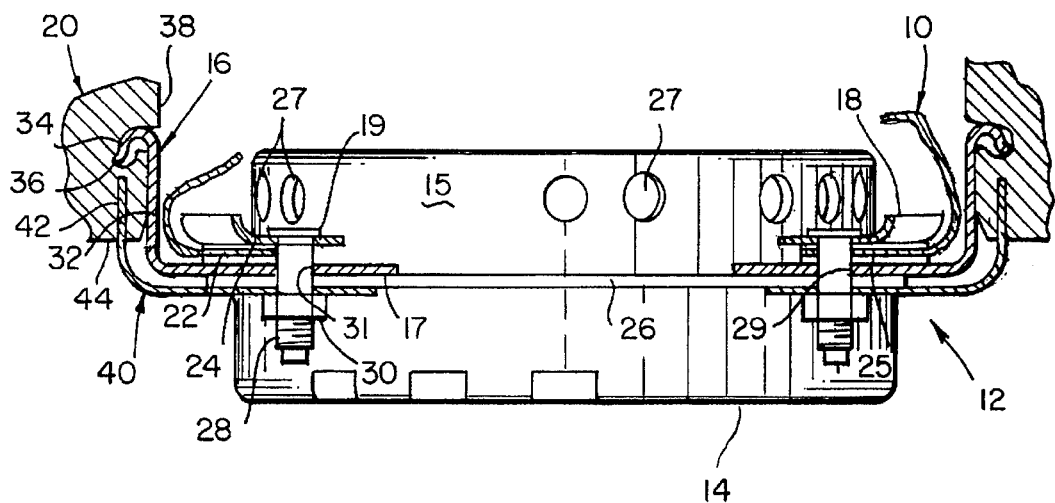
FIG. 1 is a fragmented cross sectional view of a prior art air bag retention means.

FIG. 1 discloses a commonly used clamping method for securing and retaining an air bag cushion 10 and a mating module component 12. The module component 12 comprises a generally annular inflator assembly 14, a module housing (or mounting plate) 16, a retaining ring assembly 18, and a cosmetic cover 20. Rivets or other fasteners are used to attach the retaining ring 18 to a central generally circular gas inlet opening 22 of the air bag cushion 10. The edge 24 of the opening 22 is disposed in a substantially even manner with the inner circular edge of the retaining ring 18.

A plurality of spaced fastener holes 19 are provided in the retaining ring 18 for the attachment thereof to the module housing 16 and the inflator assembly 14.

The module housing 16 is generally rectangular and disk shaped and has a generally circular opening (not shown) in the bottom 17 thereof, into which opening, from the lower side thereof as seen in the drawing, the upper wall portion 15 of the inflator assembly 14 but not the flange 26 thereof, may be inserted. The upper wall portion 15 of the inflator assembly 14 includes a plurality of ports or orifices 27 from which gas generated by the inflator assembly 14 flows when the inflator assembly 14 is initiated. A plurality of spaced fastener holes 29 are provided in the flange 26 of the inflator assembly 14. Similarly, a plurality of spaced fastener holes 31 are provided in the bottom 17 of the module housing 16. The opening in the bottom 17 of the module housing 16 is substantially the same in size as the opening in the retaining ring assembly 18 that defines the gas inlet opening 22 of the air bag cushion 10. The plurality of spaced holes 31 in the bottom 17 of the module housing 16 and the plurality of spaced holes 29 in flange 26 of the inflator assembly 14 are so positioned as to be in alignment with the plurality of holes 19 in the retaining ring 18 when superposed in a given angular relation.

The retaining ring 18 with the air bag cushion 10 attached thereto is attached by a plurality of bolts or studs 28 and nuts 30 to the module housing 16 and inflator assembly 14 with an annular portion or region 25 of the air bag cushion 10 immediately adjacent the opening 22 thereof held between the flange 26 of the inflator assembly 14 and the retaining ring assembly 18 through the module housing 16. These components are clamped by studs 28 and nuts 30 with the studs being clinched into the retaining ring assembly 18. As shown, the inflator assembly 14 is so arranged relatively to the cushion 10 and the module housing 16 that the flange 26 thereof is positioned externally of both the cushion 10 and the module housing 16.

The module housing 16 includes a surrounding upwardly extending wall 32. The upper edge of the wall 32 is curved outwardly forming a rolled-over lip 34. Lip 34 engages and is locked in mating relation in a groove 36 in the inner side of a wall 38 of cover 20 when the module housing 16 and the folded air bag cushion 10 are pressed in place within the cover 20.

A cover retaining ring 40 held against the outer side of the inflator assembly flange 26 by the studs 28 and nuts 30 includes a portion 42 that fits in a slot 44 in the wall 38 and locks the cover 20 in place on the module housing 16.

DESCRIPTION OF THE PREFERRED EMBODIMENT OF THE INVENTION

The improved method of and apparatus, according to the invention, for securing an air bag cushion to a mating module component is illustrated in FIGS. 2–6. The invention provides a simple means of clamping and securing an air bag cushion 48 during the assembly of an air bag module 46, which consists of the air bag cushion 48 having a central generally circular gas inlet opening 49 therein, an inflator assembly 50, a module housing (or mounting plate) 52 and a cosmetic cover 54, without the use of a cushion retaining ring such as the retaining ring assembly 18 disclosed in FIG. 1 which is used on all air bag modules at the present time. More particularly, the invention relates to reducing the number of component parts and providing a better and less costly means of air bag cushion retention in the air bag module assembly.

Figure 2:
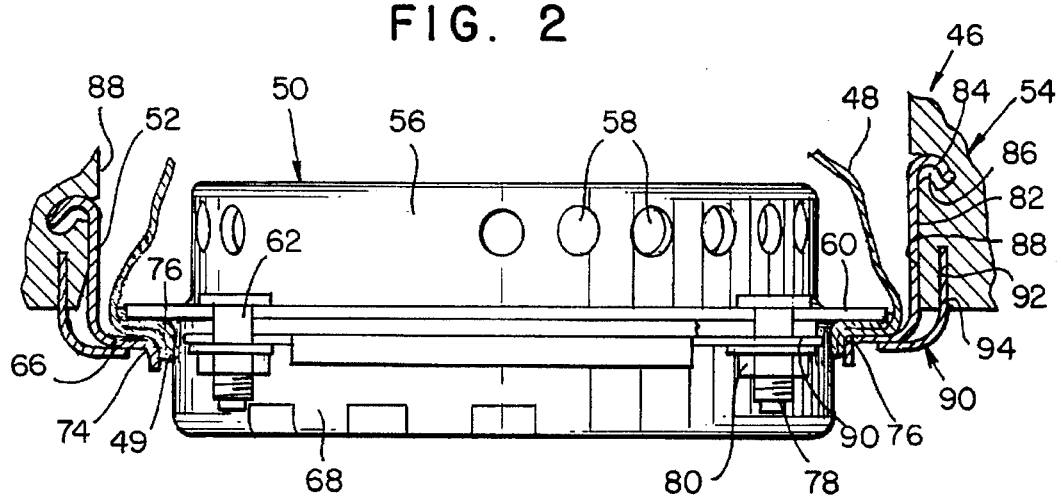
FIG. 2 is a cross sectional view illustrating the air bag retention method according to the present invention.
Figure 3:
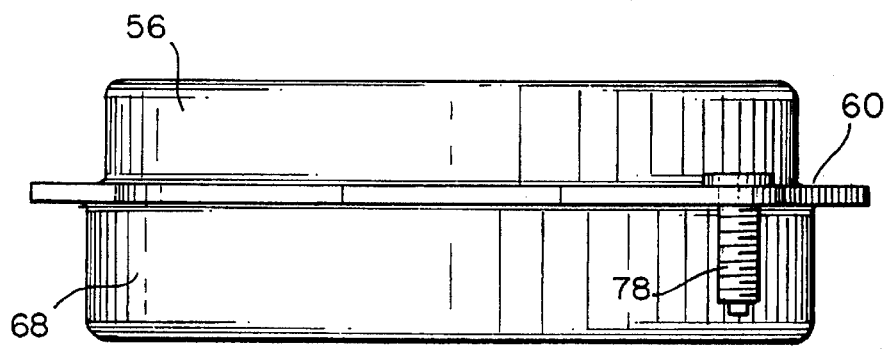
FIG. 3 is a side view of the inflator of FIG. 2.
Figure 4:
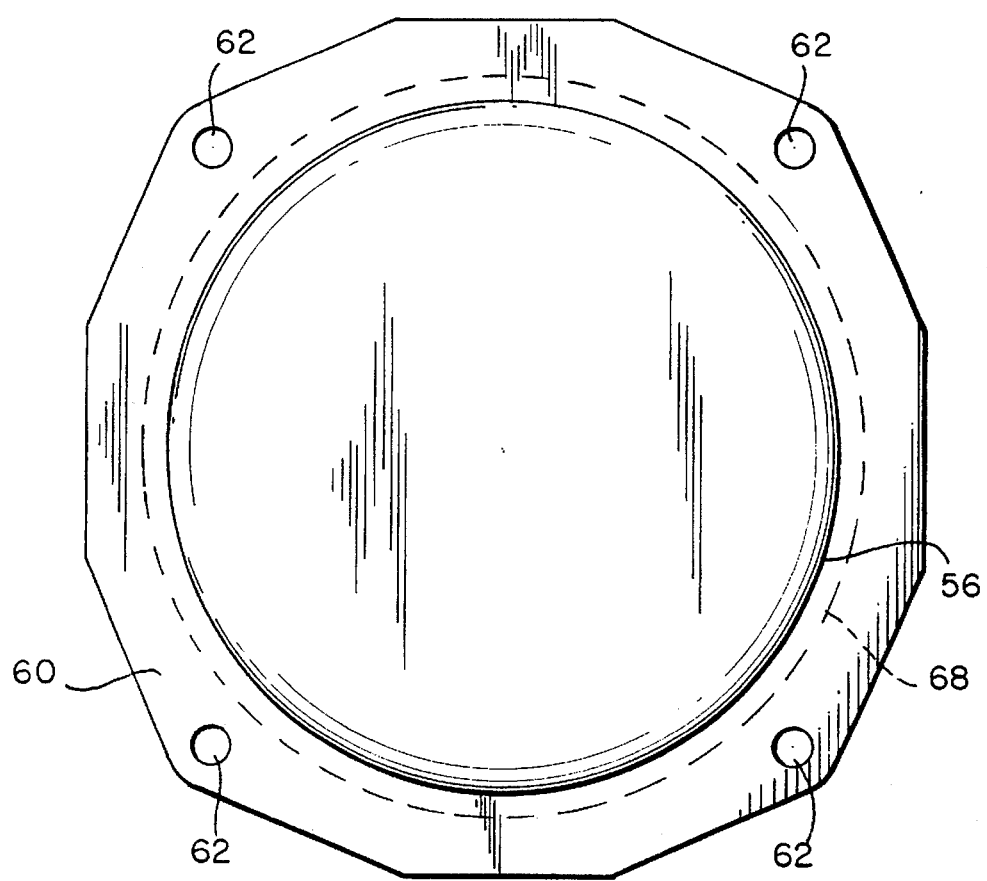
FIG. 4 is a plan view of the upper wall or inflation gas exit portion of the inflator of FIG. 3.

The configuration of the inflator 50 of FIGS. 2, 3 and 4 is generally annular similar to the inflator assembly 14 of FIG. 1 and may be identical thereto. The upper wall 56 of the inflator assembly 50 includes a plurality of ports or orifices 58 from which gas generated by the inflator assembly 50 flows when the inflator assembly 50 is initiated. A plurality of spaced fastener holes 62 are provided in a flange 60 of the inflator assembly 50.

Figure 5:
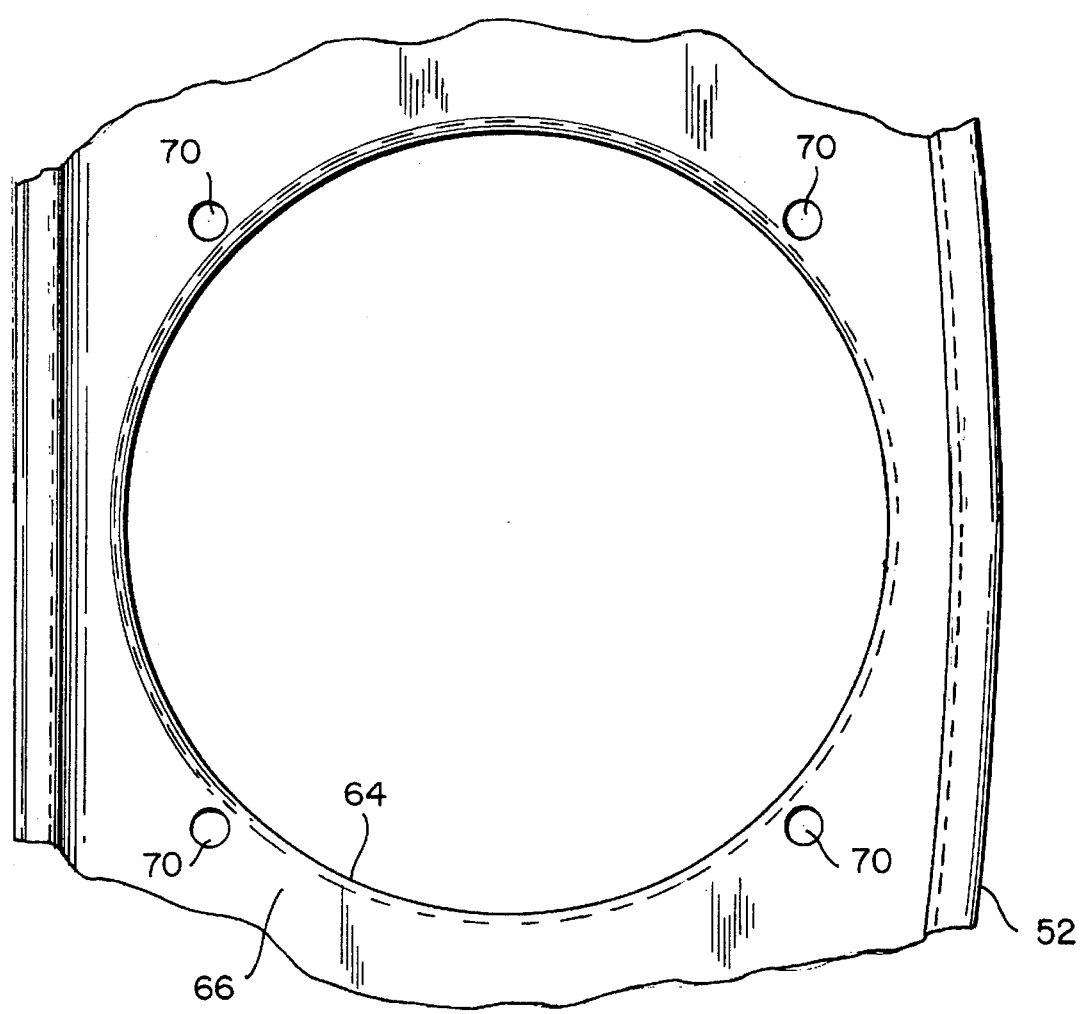
FIG. 5 is a fragmentary plan view of the module housing of FIG. 2.
Figure 6:
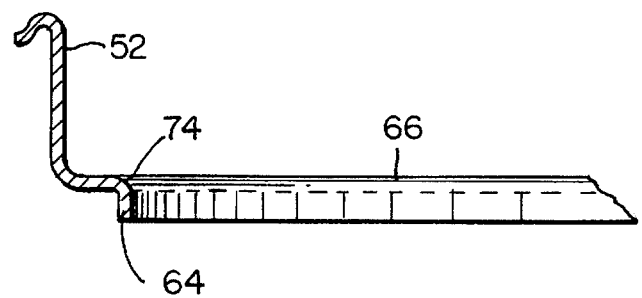
FIG. 6 is a fragmentary view of the module housing of FIG. 5 showing a curved edge matching the curvature of the inflator to the outer facing side of the inflator flange.

The module housing 52, similar to the module housing 16 in FIG. 1, is generally rectangular and disk shaped, and, as shown in FIGS. 5 and 6, has a generally circular opening 64 in the bottom 66 thereof. As shown in FIG. 2, the lower wall portion 68 of the inflator assembly 50 is inserted into the opening 64 of the module housing 52 from the upper side thereof. A plurality of spaced fastener holes 70 for the air bag cushion 48 and the inflator 50 are provided in the bottom 66 of the module housing 52.

The diameter of the circular opening 64 of the module housing 52 is slightly larger than the diameter of the lower wall portion 68 of the inflator assembly 50. Additionally as shown in FIGS. 2 and 6, an annular portion 74 of the module housing 52 adjacent the edge of the opening 64 is curved forming a downwardly extending lip that extends parallel for a short distance to the wall of the lower wall portion 68 of the inflator assembly 50. The curvature at the edge annular portion 74 generally matches the curvature of the merging of the inflator lower wall portion 68 with the lower side of the flange 60.

The amount by which the diameter of the opening 64 in the module housing 52 is larger than the diameter of the inflator lower wall portion 68 is sufficient to allow the insertion therebetween of an annular portion 76 of the air bag cushion 48 adjacent the opening 49 therein. A plurality of spaced fastener holes (not shown) are provided in the cushion annular portion 76. These holes are so positioned as to be in alignment with the plurality of fastener holes 70 in the module housing 52 and the inflator flange 60 when superposed in a given angular relation.

In assembling the air bag cushion 48 to the module housing 52 and the inflator assembly 50, a plurality of studs 78 are inserted through the holes 62 in the inflator flange 60 from the side of the inflator upper wall portion 56, which wall portion 56 contains the gas exit ports 58. The studs 78 clinch into the holes 62 with the distal ends thereof extending generally parallel to the inflator lower wall portion 68.

The inflator assembly 50 is then inserted into the gas inlet opening 49 of the air bag cushion 48. While, as shown in FIG. 2, the diameter of the cushion gas inlet opening 49 is substantially less than the diameter of the inflator assembly 50, the material of the air bag cushion 48 is sufficiently elastic to allow the insertion of the inflator assembly 50 therethrough. The inflator is so positioned that the edge of the cushion around the gas inlet opening 49, that is the annular portion 76 thereof, is wrapped around and lies inwards of and beyond the inflator flange 60 adjacent the bottom side thereof, as shown in FIG. 2. With the cushion annular portion 76 so disposed, each of the studs 78 extending from the inflator flange 60 is inserted through a hole individually associated therewith that is provided in the air bag cushion 48.

The inflator lower wall portion 68 is then inserted through the opening 64 of the module housing 52 with each of the studs 78 passing through an individually associated one of the holes 70 provided in the module housing 52 and with the material of the air bag cushion in the annular portion 74 thereof positioned in the annular space between the inflator lower wall portion 68 and the opening 64 of the module housing 52. A portion of the air bag cushion adjacent the edge of the gas inlet opening 49 may be folded back to increase the thickness of the air bag cushion material positioned in this annular space.

When nuts 80 provided on studs 78 are tightened, the annular portion 76 of the air bag cushion 48 is clamped between the inflator flange 60 and the module housing 52 and the lower wall of the inflator 50 including the curved portions of the opening 64 of the module housing 52 and the inflator lower wall portion 68 merging into the flange 62.

The force holding the gas inlet opening 49 to the module housing 52 and to the inflator assembly 50 is evenly distributed over the entire abutment involving the air bag cushion annular portion 76.

The area of the air bag cushion clamped annular portion 76 is substantially greater than the area of the air bag clamped annular portion 25 of the prior art air bag module 12 shown in FIG. 1. This increased area of the clamped annular portion 76 and the even distribution of the clamping force applied provides an improvement in the seal of the gas inlet opening 64 of the air bag cushion 48 in the air bag module 46.

The curvature of the annular portion 74 of the module housing (or mounting plate) 52 and the application of forces clamping the annular portion 74 to the inflator flange 52, the inflator lower wall portion 68, and the merging region of the inflator wall portion 68 and the flange 62 provides a beneficial stiffening effect to the module housing (or mounting plate) 52.

The module housing 52, as shown in FIG. 2, includes a surrounding upwardly extending wall 82. The upper edge of the wall 82 is curved outwardly forming a rolled-over lip 84. Lip 84 engages and is locked in mating relation in a groove 86 in the inner side of a wall 88 of cover 54 when the module housing 52 and the folded air bag cushion 48 are pressed in place within the cover 54.

A cover retaining ring 90 held against the lower side of the module housing 52 by the studs 78 and nuts 80 includes a portion 92 that fits in a slot 94 in the wall 88 and locks the cover 54 in place on the module housing 52.

Thus, in accordance with the invention, there has been provided a better and less costly means of air bag cushion retention in an air bag assembly. There has been provided such an improved air bag cushion retention means that effects an improvement in the seal of the inflating gas inlet opening of the air bag cushion. Additionally, there has been provided such an improved air bag cushion retention means that effects a beneficial stiffening of the module housing or mounting plate.

With this description of the invention in detail, those skilled in the art will appreciate that modifications may be made to the invention without departing from the spirit thereof. Therefore, it is not intended that the scope of the invention be limited to the specific embodiment that is illustrated and described. Rather, it is intended that the scope of the invention be determined by the appended claims and their equivalents.

What is claimed is:

1. A method of securing an inflatable cushion to an air bag module, which air bag module consists of a supporting plate and a generally annular inflator having an upper wall portion and a lower wall portion and an intermediately positioned flange having a lower facing side and with an upper wall portion including ports from which cushion inflating gas issues when the inflator is initiated, the lower wall portion including a curved merging region adjacent said lower facing side of said flange, and the flange having a plurality of spaced fastener holes therein, comprising the steps of:

(a) forming a generally circular gas inlet opening in the inflatable cushion having a diameter that is slightly less than the diameter of the inflator lower wall portion, (b) forming an opening in the supporting plate the diameter of which opening is larger than the diameter of the inflator lower wall portion and the edge of which opening includes a downwardly curved portion that matches the curvature of the merging region of the inflator lower wall portion adjacent said lower facing side of said flange, the amount by which the diameter of the opening in the supporting plate is larger than the diameter of the inflator lower wall portion being sufficient to allow the insertion therebetween of an annular portion of said inflatable cushion adjacent the inflatable cushion gas inlet opening, (c) inserting and clinching a plurality of studs into the spaced fastener holes of the inflator flange from the side thereof adjacent the inflator upper wall portion, (d) inserting the inflator upper wall portion and the flange into the gas inlet opening in the inflatable cushion and positioning the inflator such that an annular portion of the cushion adjacent the edge of the gas inlet opening is wrapped around and lies inward of and beyond said flange, and is positioned to be clamped around the curvature of the opening of said supporting plate and around the lower wall portion of said inflator, (e) extending each of the studs through a hole individual thereto that is provided in the material of the inflatable cushion in an annular region surrounding the gas inlet opening therein, with each of the holes in the material of the inflatable cushion positioned to allow a distance beyond said flange at which the gas inlet opening lies to provide an area of the inflatable cushion annular portion adjacent the gas inlet opening that can be clamped, with the force holding the gas inlet opening of the cushion to the supporting plate and inflator evenly distributed over the clamped annular portion of the cushion, (f) inserting the inflator lower wall portion and the annular portion of the inflatable cushion adjacent the gas inlet opening into the opening in the supporting plate and extending each of the studs through a hole individual thereto that is provided therein in an annular region adjacent the opening in the supporting plate, and (g) providing nuts on the studs and tightening them to clamp the annular portion of the inflatable cushion adjacent the gas inlet opening between the curved annular portion of the supporting plate adjacent the opening therein against the adjacent side of the inflator flange and the inflator lower wall portion including the merging region of said inflator wall portion and flange.

2. A method as defined by claim 1 including the further step between steps (f) and (g) of (h) folding back the edge of the inflatable cushion at the edge of the gas inlet opening to increase the thickness of the inflatable cushion material in the annular space between the inflator lower wall portion and the opening in the supporting plate.

3. A method as defined by claim 1 wherein the supporting plate comprises a module housing.

4. A vehicle occupant air bag module safety apparatus comprising, an inflatable air bag cushion having a generally circular gas inlet opening and having a plurality of spaced holes in an annular region surrounding said gas inlet opening, an inflator for inflating the air bag cushion, said inflator having a general annular configuration with an upper wall portion having generated gas exit ports therein, a lower wall portion, and an intermediately positioned flange having a lower facing side adjacent said lower wall portion of said inflator, with the diameter, at least, of said inflator lower wall portion being slightly greater than that of said air bag cushion gas inlet opening, said inflator lower wall portion including a curved annular merging region with the adjacent side of said inflator flange, said inflator flange including a plurality of spaced holes therein, a support plate, said support plate having an opening therein that is larger than that of the inflator lower wall portion and including a downwardly curved annular portion that matches the curvature of the merging annular region of the inflator lower wall portion and the flange, the amount by which the opening in the supporting plate is larger than the inflator lower wall portion being sufficient to allow the insertion therebetween of an annular portion of the inflatable cushion adjacent the inflatable cushion gas inlet opening, said support plate having a plurality of spaced holes in an annular region surrounding said opening therein, and a stud clinched in each of said plurality of spaced holes in said inflator flange from the side thereof adjacent said inflator upper portion, said inflator upper portion and flange being inserted in said air bag cushion gas inlet opening and positioned such that an annular portion of the cushion adjacent the edge of the gas inlet opening is wrapped around and lies inwardly of and beyond the inflator flange and positioned to be clamped around the curvature of the opening of said support plate and around the lower wall portion of said inflator, with each of said studs extending through a hole individual thereto of said plurality of holes in said annular region surrounding said cushion gas inlet opening, with each of the holes in said cushion positioned to allow a distance beyond the inflator flange at which the gas inlet opening lies to provide an area of the annular portion of the cushion adjacent the cushion gas inlet opening that can be clamped with the force holding the gas inlet opening of the cushion to the support plate and inflator evenly distributed over the clamped annular portion of the cushion, said inflator lower wall portion and the annular portion of said air bag cushion adjacent the gas inlet opening therein being inserted through the opening of said support plate with each of said studs extending through a hole individual thereto in said support plate in said annular region adjacent the opening therein, and a nut provided on each of said studs and tightened to clamp the annular portion of the inflatable cushion adjacent the gas inlet opening between the curved annular portion of the supporting plate adjacent the opening therein and the adjacent side of the inflator flange and the inflator lower wall portion including the curved merging annular region of the inflator well portion and flange, whereby there is provided an improvement in the seal of the gas inlet opening of the air bag cushion of the air bag module.

5. A vehicle occupant air bag module safety apparatus as defined by claim 4 wherein the supporting plate comprises a module housing.

6. A vehicle occupant air bag module safety apparatus as defined by claim 5 wherein the module housing has a dish shaped configuration and includes an upper edge that is curved outwardly to form a rolled-over lip, and wherein there is further included a cover for said air bag cushion, said inflator and said module housing, said cover having a wall with a groove formed on the inner side thereof, said rolled-over lip on the upper edge of said module housing engaging and being locked in mating relation with said groove in said wall of said cover when the folded air bag cushion and module housing are pressed in place within the cover.

* * * * *

UNITED STATES PATENT AND TRADEMARK OFFICE
CERTIFICATE OF CORRECTION

PATENT NO. : 5,634,658
DATED : June 3, 1997
INVENTOR(S) : Gary V. Adams

It is certified that error appears in the above-indentified patent and that said Letters Patent is hereby corrected as shown below:

```
Col. 2, Ln. 32, correct "the 10 inflator" to read
        -- the inflator -- .
Col. 3, Ln. 45, correct "disk" to read -- dish -- .
Col. 4, Ln. 49, correct "disk" to read -- dish -- .
```

Signed and Sealed this

Twelfth Day of January, 1999

Attest:

Attesting Officer

*Acting Commissioner of Patents and Trademarks*